(12) United States Patent (10) Patent No.: US 12,635,662 B2
Guo (45) Date of Patent: May 26, 2026

(54) REPLACEABLE FULLY-AUTOMATIC CAT LITTER CLEANING DEVICE

(71) Applicant: YINENG BRAND MANAGEMENT (SHANGHAI) STUDIO, Shanghai (CN)

(72) Inventor: Chaofeng Guo, Shanghai (CN)

(73) Assignee: YINENG BRAND MANAGEMENT (SHANGHAI) STUDIO, Shanghai (CN)

( * ) Notice: Subject to any disclaimer, the term of this patent is extended or adjusted under 35 U.S.C. 154(b) by 325 days.

(21) Appl. No.: 17/339,224

(22) Filed: Jun. 4, 2021

(65) Prior Publication Data

US 2022/0279750 A1 Sep. 8, 2022

(51) Int. Cl.
*A01K 1/01* (2006.01)

(52) U.S. Cl.
CPC .................................. *A01K 1/0114* (2013.01)

(58) Field of Classification Search
CPC .... A01K 1/0114; A01K 1/011; A01K 1/0125; A01K 1/0107
USPC ........................................................... 119/166
See application file for complete search history.

(56) References Cited

U.S. PATENT DOCUMENTS

| | | | | |
|---|---|---|---|---|
| 3,482,546 A | * | 12/1969 | Anderson | A01K 1/0114 |
| | | | | 119/166 |
| 4,120,264 A | * | 10/1978 | Carter | A01K 1/0114 |
| | | | | 119/166 |

| | | | | |
|---|---|---|---|---|
| 4,327,667 A | * | 5/1982 | Bilak | A01K 1/0114 |
| | | | | 209/352 |
| 4,522,150 A | * | 6/1985 | Gershman | A01K 1/0114 |
| | | | | 119/165 |
| 4,667,622 A | * | 5/1987 | Breault | A01K 1/0107 |
| | | | | 119/165 |
| 4,711,198 A | * | 12/1987 | Mossbarger | A01K 1/0125 |
| | | | | 119/168 |
| 4,723,510 A | * | 2/1988 | Skillestad | A01K 1/0114 |
| | | | | 119/167 |
| 4,792,082 A | * | 12/1988 | Williamson | A01K 1/0125 |
| | | | | 229/122 |
| 4,846,104 A | * | 7/1989 | Pierson, Jr. | A01K 1/0114 |
| | | | | 209/235 |
| 5,048,464 A | * | 9/1991 | Shirley | A01K 1/0114 |
| | | | | 209/362 |

(Continued)

FOREIGN PATENT DOCUMENTS

| | | | | |
|---|---|---|---|---|
| CA | 2132551 A1 | * | 8/1995 | |
| CN | 208691997 U | * | 4/2019 | |

(Continued)

*Primary Examiner* — Peter M Poon
*Assistant Examiner* — Angelica Alejandra Almeida Bonnin
(74) *Attorney, Agent, or Firm* — Kenneth Q. Lao; WARE FRESSOLA MAGUIRE & BARBER LLP

(57) ABSTRACT

A replaceable fully-automatic cat litter cleaning device has a housing and a litter cabin and a driving device arranged in the housing. The driving device is arranged to rotate the litter cabin. The litter cabin has a cabin body with a cavity to receive a replacement box. A connecting part is arranged on the outer periphery of the cabin body for connection with the driving device. The replacement box has an entrance. A waste container is arranged inside the replacement box. The replacement box can be taken out as a whole when replacing it.

11 Claims, 9 Drawing Sheets

(56)  References Cited

U.S. PATENT DOCUMENTS

| | | | | | |
|---|---|---|---|---|---|
| 5,080,043 | A * | 1/1992 | Fields | A01K 1/0125 | 383/33 |
| 5,107,797 | A * | 4/1992 | LaRoche | A01K 1/0114 | 209/296 |
| 5,167,204 | A * | 12/1992 | Nussle | A01K 1/0114 | 209/634 |
| 5,178,099 | A * | 1/1993 | Lapps | A01K 1/0114 | 119/161 |
| 5,178,100 | A * | 1/1993 | Monk | A01K 1/0125 | 229/117.02 |
| 5,203,282 | A * | 4/1993 | Hasiuk | A01K 1/0125 | 119/168 |
| 5,551,375 | A * | 9/1996 | Flores | A01K 1/0114 | 119/166 |
| 5,755,182 | A * | 5/1998 | Brown, Jr. | A01K 1/0114 | 119/165 |
| 5,765,504 | A * | 6/1998 | Evans | A01K 1/0125 | 119/168 |
| 5,911,194 | A * | 6/1999 | Pierson, Jr. | A01K 1/0114 | 119/166 |
| 5,931,119 | A * | 8/1999 | Nissim | A01K 1/0114 | 119/166 |
| 6,126,015 | A * | 10/2000 | Haymaker | B07B 1/28 | 209/362 |
| 6,286,457 | B1 * | 9/2001 | Sugahara | A01K 1/0114 | 119/161 |
| 6,997,137 | B1 * | 2/2006 | Ricke | A01K 1/011 | 119/168 |
| 8,413,608 | B2 * | 4/2013 | Sharp | A01K 29/00 | 119/166 |
| 9,204,618 | B2 * | 12/2015 | Schouwink | A01K 1/0245 | |
| 10,098,315 | B2 * | 10/2018 | Couto | A01K 1/0114 | |
| 2002/0069830 | A1 * | 6/2002 | Clemmons | A01K 1/035 | 119/165 |
| 2002/0139312 | A1 * | 10/2002 | Reitz | A01K 1/0114 | 119/165 |
| 2008/0017123 | A1 * | 1/2008 | Chin | A01K 1/011 | 119/166 |
| 2010/0095899 | A1 * | 4/2010 | Lipscomb | A01K 1/0114 | 119/167 |
| 2011/0088630 | A1 * | 4/2011 | Krotts | A01K 1/0114 | 119/166 |
| 2013/0019810 | A1 * | 1/2013 | Romano | A01K 1/0114 | 119/167 |
| 2016/0374306 | A1 * | 12/2016 | Romano | A01K 1/0114 | 119/166 |
| 2017/0042114 | A1 * | 2/2017 | Waid | A01K 1/0114 | |
| 2017/0258034 | A1 * | 9/2017 | Robbins | A01K 1/0125 | |
| 2018/0020635 | A1 * | 1/2018 | Huang | A01K 1/0114 | 119/166 |
| 2021/0051916 | A1 * | 2/2021 | Weber | A01K 1/0155 | |

FOREIGN PATENT DOCUMENTS

| | | | | |
|---|---|---|---|---|
| CN | 210247874 U | * | 4/2020 | |
| CN | 210445229 U | * | 5/2020 | |
| CN | 210726325 U | * | 6/2020 | |
| CN | 211703250 U | * | 10/2020 | |
| EP | 0610993 A1 | * | 8/1994 | |
| NL | 9300249 A | * | 9/1994 | A01K 1/0114 |
| WO | WO-2016190765 A1 | * | 12/2016 | A01K 1/0107 |
| WO | WO-2021114579 A1 | * | 6/2021 | A01K 1/0107 |
| WO | WO-2022002026 A1 | * | 1/2022 | |

* cited by examiner clockwise
rotation

REPLACEABLE FULLY-AUTOMATIC CAT LITTER CLEANING DEVICE

CROSS REFERENCE TO RELATED APPLICATION

This application claims priority to Chinese patent application no. CN2021102299362.8, filed Mar. 2, 2021, which is hereby incorporated by reference in its entirety.

TECHNICAL FIELD

The invention relates to a cleaning device for cat litter, in particular to a replaceable automatic cat litter cleaning device.

BACKGROUND

Automatic cat litter cleaning devices currently on the market have the following shortcomings: Although the waste can be automatically cleaned or there is a separate storage waste container, when the waste is full, it must be taken out manually. When the waste container is taken out, the air is full of the stench of cat feces once the box is opened, and this process is extremely disgusting because users are inevitably exposed to this unpleasant odor.

For all devices currently in use on the market, cats' excrement or urine will come in contact with the device during use. Those devices can be divided into full-contact devices and local-contact devices according to the degree of contact. For the full-contact models, cat litter is directly placed in the device, with the cat urinating and defecating directly in the device. The device will inevitably be contaminated when the cat litter cannot completely cover the litter supporting box, and the device might be blocked in serious cases. The device needs to be wiped or cleaned manually every once in a while. For local-contact models, the cat litter is placed in the replacement box, with the cat urinating or defecating in the replacement box. Although most parts of the device do not come into contact with urine and excrement, some parts are inevitably contaminated. Thus, parts cleaning and manual wiping or cleaning of the device are required where contamination occurs. For some devices, the waste container is not completely sealed, and communicates with the outside air and usually emits a bad smell, seriously affecting the comfort of people.

SUMMARY OF THE INVENTION

In order to solve the technical problems of the cat litter cleaning devices, such as the requirement for manual cleaning of the cats' feces, and the difficulty in cleaning the inside of the device and the treatment of the bad smell, the present invention provides a replaceable automatic cat litter cleaning device, as described below.

A replaceable fully-automatic cat litter cleaning device, according to an embodiment of the present invention, has a housing, a cat litter cabin and a driving device. The cat litter cabin and the driving device are arranged in the housing, and the driving device is connected to the cat litter cabin to rotate the cat litter cabin. The cat litter cabin has a cabin body and a replacement box, and a connecting part arranged on the outer periphery of the cabin body for connection with the driving device. The cabin body has a cavity and the replacement box is arranged inside the cavity and connected with the cavity, and an entrance is arranged on the replacement box.

According to an embodiment, the replacement box has a waste container, a separation area and a main box zone, and the waste container is separated from the main box zone through a partition, and an inwardly-turning trap door is arranged on the side facing the main box zone. The separation area is arranged adjacent to the waste container, a screen is arranged between the separation area and the main box zone, and the entrance is arranged on the side of the main box zone.

According to an embodiment, the replacement box is a cuboid, and the waste container and the separation area are arranged on the peripheral surface of the side perpendicular to the entrance side.

According to an embodiment, the main box zone has creases used for folding the main box zone.

According to an embodiment, the driving device has a driving motor, a worm and worm gears, wherein the cabin body connecting part is a rack, and the output end of the driving motor is connected with the worm, and the worm is connected with the rack through the worm gears.

According to an embodiment, the replacement box is magnetically connected with or plugged into the cabin cavity.

According to an embodiment, the cabin cavity is arranged with a sliding groove which further includes a supporting box, a sliding rail matching the sliding groove arranged on the edge of the supporting box, and a supporting leg matching the sliding groove arranged at the bottom of the supporting box.

According to an embodiment, the housing has a shell and a panel, wherein the panel is hinged with the shell, and an opening matching the entrance of the replacement box is arranged on the panel.

According to an embodiment, the inner ring of the opening extends inward to form a baffle.

According to an embodiment, the device also has a central processing unit, a position sensor and an induction sensor, wherein the induction sensor is arranged at the entrance of the cat litter cabin, the position sensor arranged in the housing, and the central processing unit is electrically connected to the position sensor, the induction sensor and the drive motor. The central processing unit controls the driving motor to work according to the signals of the induction sensor and the position sensor. The position sensor is a travel switch.

The advantages of the invention include: The waste container is arranged inside the replacement box. The replacement box can be taken out as a whole when replacing and the user will not contact or see the waste inside. Used with special cat litter, the replacement box can be used for nearly a month for one cat, which greatly reduces the chore of keeping a cat.

As the cat urinates and defecates in the replacement box, the replacement box integrates all the functions such as waste separation, storage, and isolation. The device is free of contamination of the cats' excrement and there is no need to clean it.

The waste container in the replacement box has a natural sealing function, which can completely isolate the odor and prevent the odor from being discharged. It can be conveniently used indoors.

The cat litter compartment rotates with the device in a left-to-right manner to automatically level the cat litter in the box. Thus, there is no need for manual levelling, which can maximize the cover area of the cat litter, ensuring that the cat only urinates on the cat litter, and preventing the cat from urinating and defecating on the area other than the cat litter.

The folding design of the replacement box can save transportation costs. The trap door is equipped with a baffle to prevent the cat litter from spilling.

REFERENCE NUMBERS IN THE DRAWINGS

Figure 1:
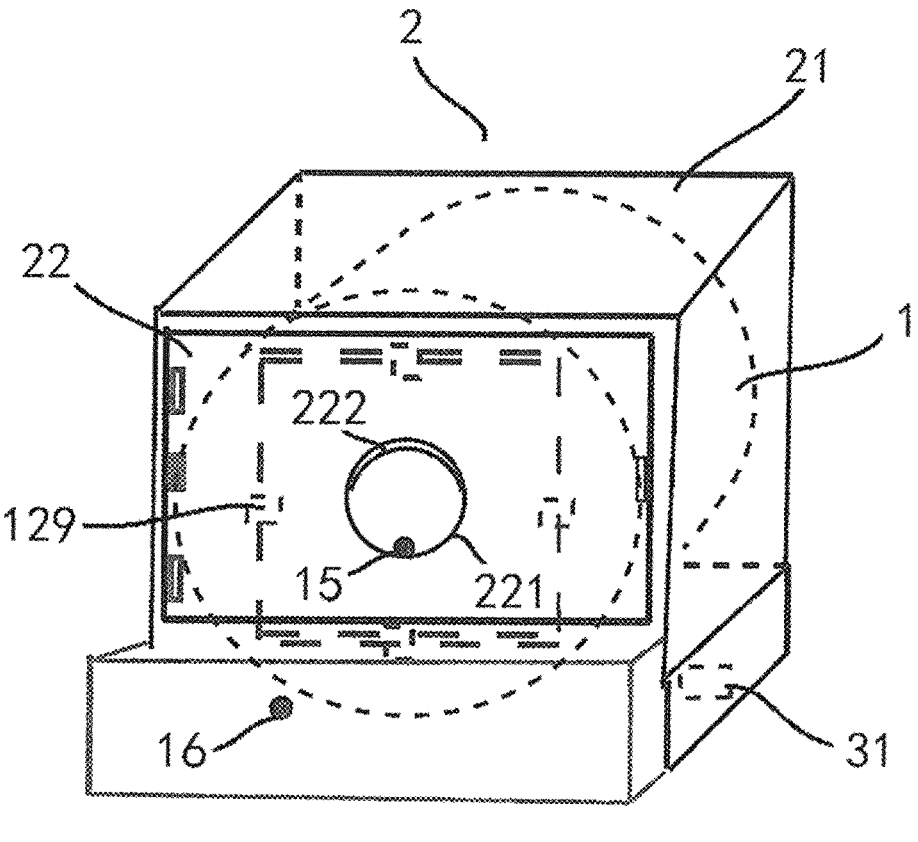
FIG. 1 is a schematic diagram of the device set forth in the invention.

1-Cat litter cabin;

11-Cabin body; 110-Cavity; 111-Sliding Groove

12-Replacement box; 121-Entrance; 122-Main box zone; 123-Waste container; 124-Separation area; 125-Trap Door; 1251-Baffle; 126-Screen; 127-Stopper groove; 128-Folding crease; 129-Buckle;

13-Iron piece; 14-Rack; 15-Induction sensor; 16-Travel switch; 17-Supporting box; 171-Sliding rail; 172-Handle; 173-Supporting leg; 174-Flange; 2-Housing; 21-Shell; 22-Panel; 221-Opening; 222-Baffle 223-Adjusting pin 24-Pedal;

3-Driving device; 31-Driving motor; 32-Worm; 33-Worm gear; 34-Bearing. 4-Cat litter; 5-Excrement;

DETAILED DESCRIPTION OF INVENTION

An embodiment of the present invention is described in detail below. Examples of the embodiments are shown in the appended drawings, in which the same or similar reference numerals indicate the same or elements with the same or similar functions. The embodiments described below with reference to the accompanying drawings are exemplary, and are intended to explain how the device of present invention works, but should not be construed as limiting the present invention.

Figure 2:
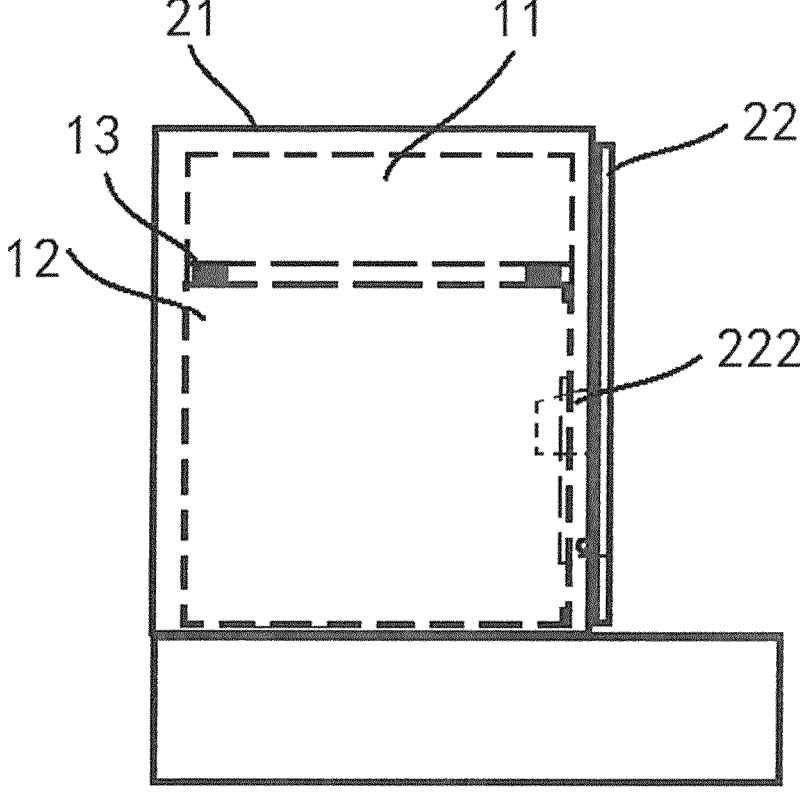
FIG. 2 is the left side view of FIG. 1.

As shown in FIG. 1 and FIG. 2, an embodiment of the invention is a replaceable fully-automatic cat litter cleaning device, which has a housing 2, a cat litter cabin 1 and a driving device 3. The cat litter cabin 1 and the driving device 3 are arranged in the housing 2, and the driving device 3 is connected to the cat litter cabin 1 for rotating the cat litter cabin 1. The cat litter cabin 1 has a cabin body 11 and a replacement box 12, and a connecting part is arranged on the outer periphery of the cabin body 11 for the connection with the driving device 3. The cabin body 11 has a cavity 110, and the replacement box 12 is arranged inside and connected with the cavity 110. An entrance 121 is arranged on the replacement box 12 to allow a cat to enter the replacement box.

The housing 2 has a shell 21 and a panel 22. The panel 22 is hinged to the shell 21, and the panel 22 is arranged with an opening 221 matching the entrance of the replacement box 121. The inner ring of the opening 221 extends inward to form a baffle 222, which extends into the entrance 121 of the replacement box when in use to prevent the spilling of the cat litter 4 during the rotation of the cat litter bin 1. A pedal 224 is extended out from the bottom of the housing 2 and adjusting pins 223 are arranged at the four corners of the bottom of the housing 2 for adjusting the level of the housing.

Figure 3:
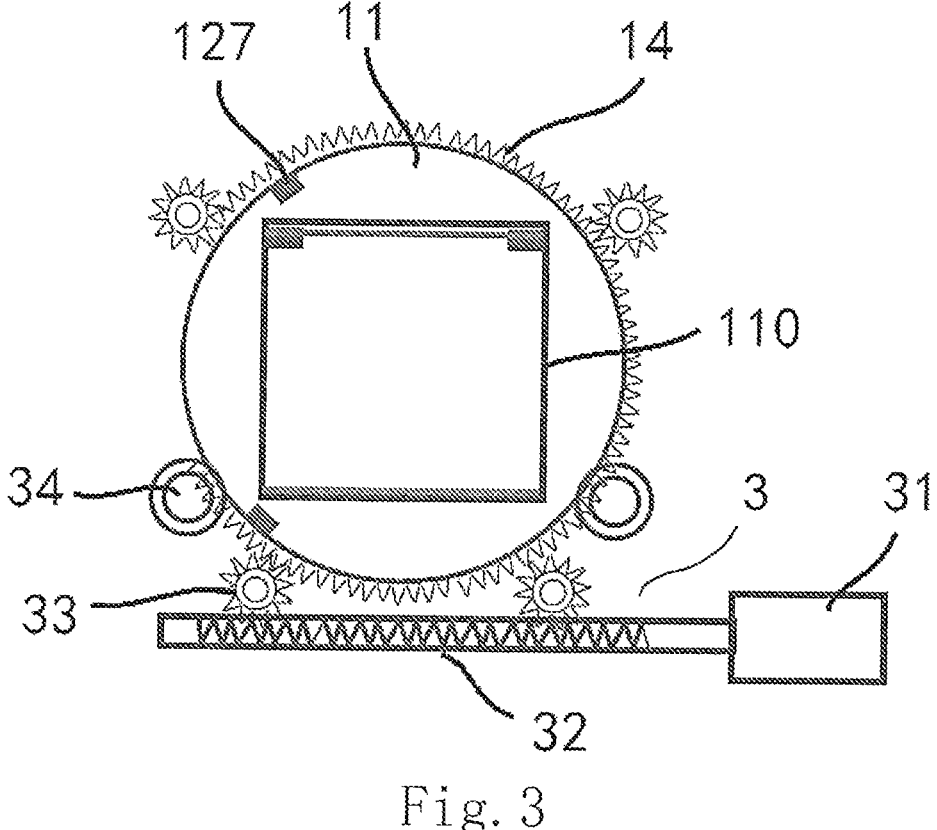
FIG. 3 is a diagram of the driving mechanism of the invention.

As shown in FIG. 3, the driving device 3 has a driving motor 31, a worm 32, and worm gears 33. A rack 14 serves as the connecting part of the cabin body 11, and the output end of the driving motor 31 is connected to the worm 32. The worm 32 is connected to rack 14 by worm gear 33. A number of bearings 34 are arranged between the cabin body and the housing 2 to facilitate the rotation of the litter cabin 1. A stopper groove 127 is arranged near the both ends of rack 14 on the outer periphery of cabin body 11 for triggering the travel switch 16.

Figure 4:
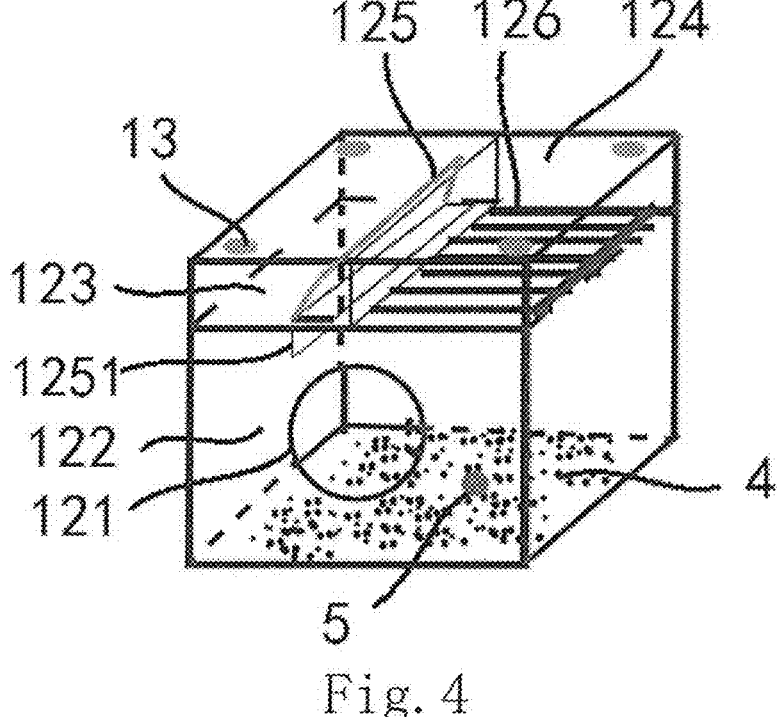
FIG. 4 is a schematic diagram of the replacement box.

As shown in FIG. 4, the replacement box 12 is a cuboid. The replacement box 12 includes a waste container 123, a separation area 124 and a main box zone 122. The waste container 123 is separated from the main box zone 122 by a partition. An inwardly-turning trap door 125 is arranged on the side facing the main box zone 122, and the separation area 124 is arranged adjacent to the waste container 123, and screen 126 is arranged between the separation area 124 and the main box zone 122. The entrance 121 is arranged at one side of the main box zone 122, and the waste container 123 and separation area 124 are arranged on the peripheral surface perpendicular to the side of the entrance 121. A baffle 1251 is arranged on the hinged side of the trap door 125 of the waste container 123 to prevent the excrement 5 from moving too fast or jolting over the opening of trap door 125.

A magnet component is arranged in the cabin cavity 110, and a matching magnet component is arranged on the outer periphery of the replacement box 12, and a magnet or an iron sheet 13 can be used. A stopper mechanism such as a buckle 129 is arranged at the opening of the cabin cavity for securing the replacement box 12.

Figure 5:
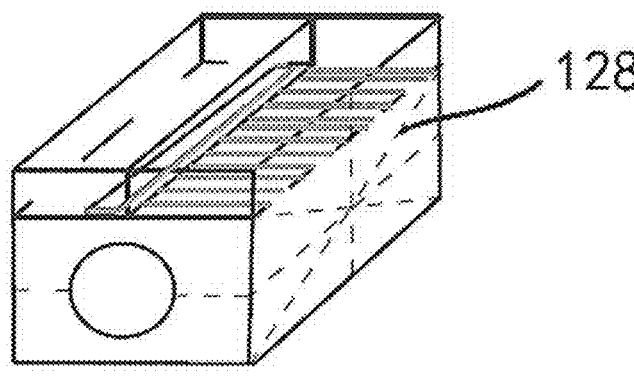
FIG. 5 shows the creases for folding the replacement box.
Figure 6:
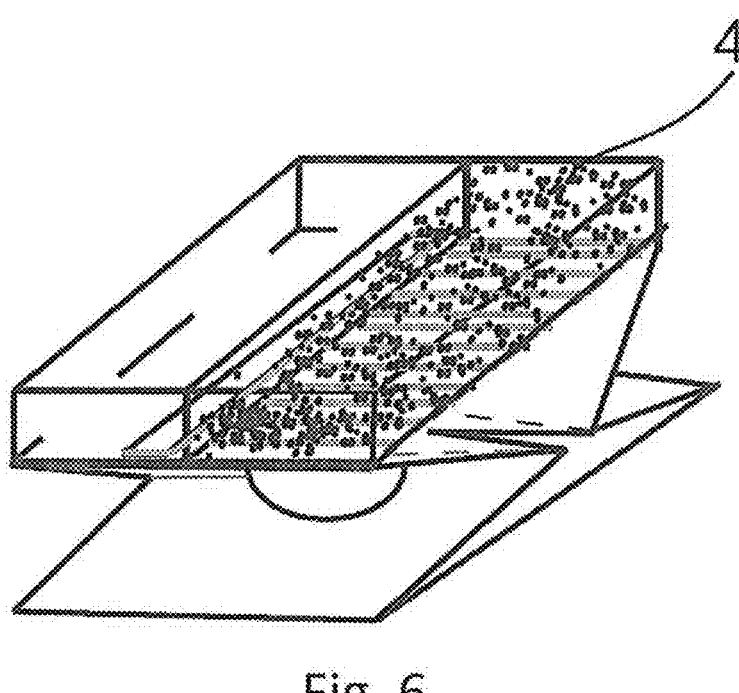
FIG. 6 shows is the replacement box being folded.

As shown in FIG. 5, the main box zone 122 of the replacement box 12 has creases 128 for folding the main box zone, and the main box zone 122 can be folded to a configuration as shown in FIG. 6 through the folding creases, and the main box zone 122 can be finally folded into a flat configuration.

An embodiment of the replacement box 12 is shown in FIG. 6, in which cat litter 4 is placed in the separation area 124 in advance, so that the user only needs to put the replacement box 12 into the cabin cavity 110 for direct use.

Figure 7:
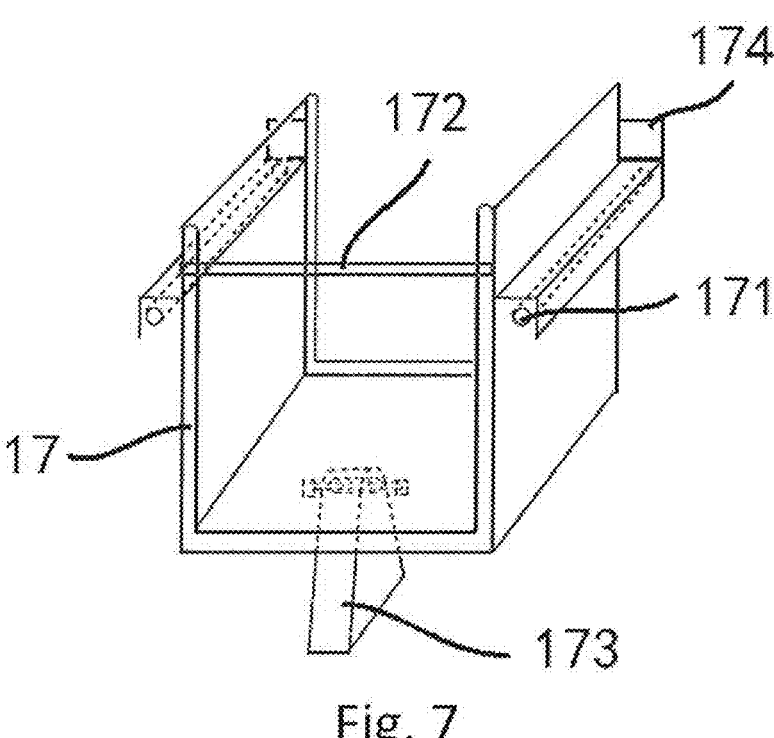
FIG. 7 is a schematic diagram of the supporting box according to an embodiment of the invention.
Figure 8:
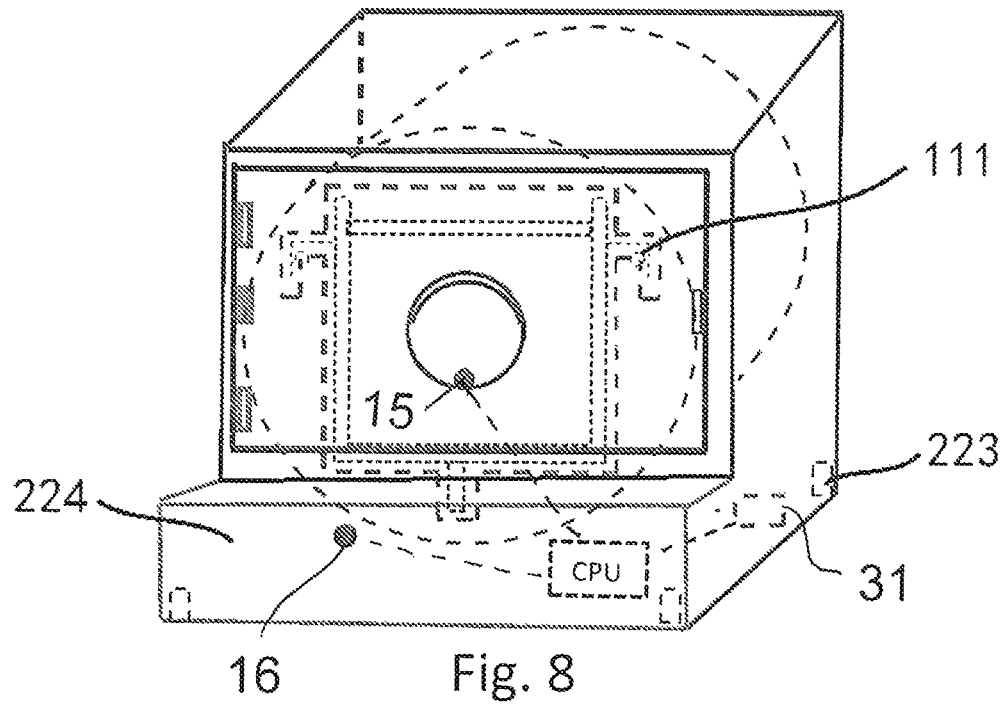
FIG. 8 is a schematic diagram of the cabin body with the supporting box.

As shown in FIG. 7 and FIG. 8, the device also has a flattened U-shaped supporting box 17, and both sides of the top opening extend to form slide rails 171 for wedging the cabin cavity 110. The front end of the supporting box 17 is arranged with a handle 172. The bottom of the supporting box 17 is provided with a supporting leg 173. Sliding groove 111 matching the sliding rails 171 is provided. A supporting leg 173 is arranged above the cavity 110. The supporting box 17 is pre-placed in the cavity 110 of the cabin 11, and a flange 174 is arranged at the end of the sliding rail 171 of the supporting box 17 for preventing the supporting box 17 from disengaging from cavity 110.

When using the cat litter cleaning device, the user can pull out the supporting box 17 through the handle 172, and puts the replacement box 12 into the opening on the top surface of the supporting box 17. The supporting leg of the supporting box 17 is arranged to support the weight of the replacement box 12.

In an embodiment of the present invention, the supporting leg 173 is trapezoidal, and the front end of the upper plane of the supporting leg 173 is hinged to the supporting box 17. When the supporting box 17 is retrieved into the cavity 110, the handle 172 is arranged to be folded into the sliding groove 111 to reduce the depth of the sliding groove 111 at the bottom. When the supporting box 17 is pulled out, the supporting leg 173 is arranged to come out automatically by gravity to support the supporting box 17 upright. To facilitate the automatic cleaning of the cat litter cleaning device, the cleaning device also includes a central processing unit, a position sensor and an induction sensor. The induction sensor 15 is arranged at the entrance 121 side of the cat litter cabin. The central processor unit (CPU) is electrically connected to the position sensor, the induction sensor 15 and the drive motor 31. The position sensor is arranged in the cat litter cabin, the central processor unit controls the drive motor to work according to the signals generated by the induction sensor 15 and the position sensor. The position sensor is a travel switch 16, and a stopper groove 127 is arranged on the cabin body 11 of the cat litter cabin 1.

To use the cat litter cleaning device, the user can open the panel 22 and, if the cabin body 11 has a supporting box 17, the user can pull out the supporting box 17, unfold the folded replacement box 12, put the replacement box 12 into the supporting box 17 and push the supporting box 17 into the cavity 110 of cabin body 11 of cat litter cabin 1. If the cabin body 11 has no supporting box therein, just directly push the replacement box 12 into the cavity 110.

The replacement box 12 has an iron sheet 13 to magnetically couple to the magnet component in the cavity 110 for countering the weight of the waste container 123 in the replacement box 12, so as to prevent the collapse of the main box zone 122 of the replacement box 12 because of the folding creases.

When the cat enters the replacement box 12 through the entrance 121, the induction sensor 15 senses the cat's entry through the entrance. The default continuous sensing period is set to be 20 seconds, that is, the time during which the pet excretes in the cat litter cabin 1. About one minute after the cat leaves the replacement box 12, the driving motor 31 begins to drive the cat litter cabin 1 to rotate in the clockwise direction.

Figure 9:
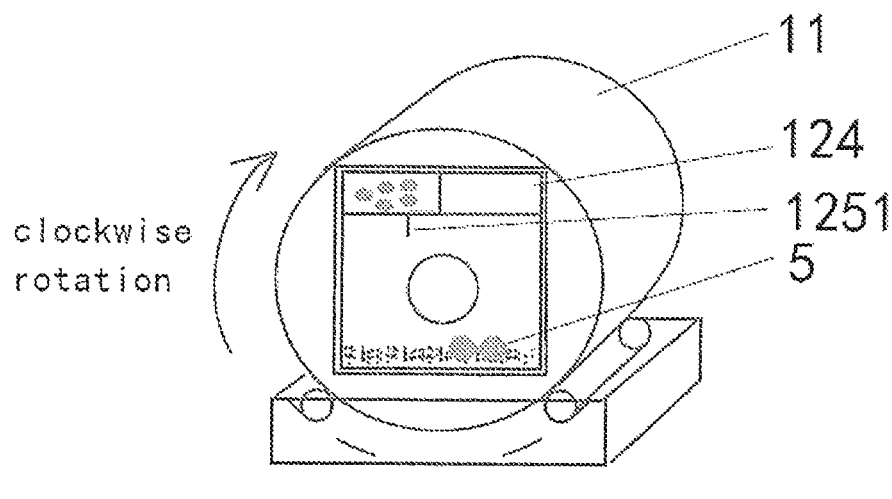
FIG. 9 shows the cat litter cabin at the start of rotation.
Figure 10:
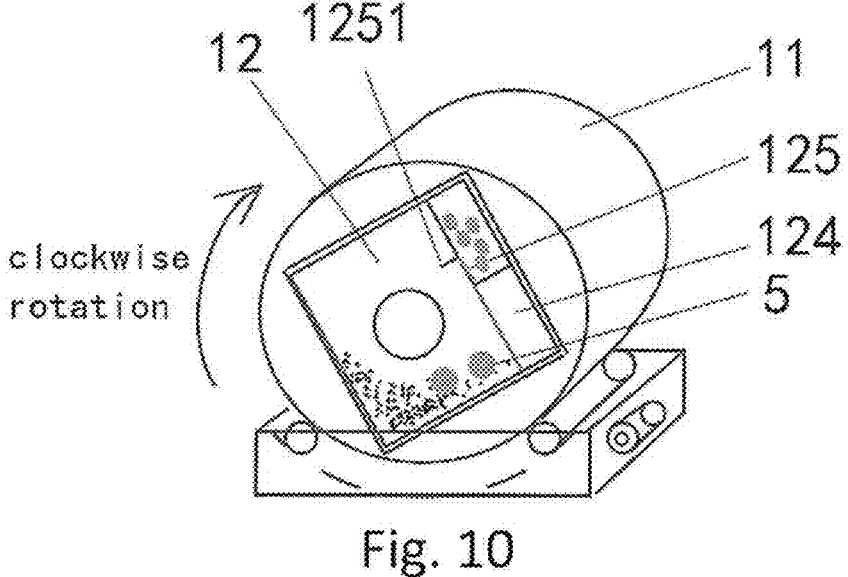
FIG. 10 shows a position of the cat litter cabin in rotation.

As the cat litter bin 1 rotates, as shown in FIG. 9 and FIG. 10, the cat litter 4 and excrement 5 gradually move to the cat litter separation area 124. At this time, the trap door 125 of the waste container 123 is closed in order to avoid the spilling of the excrement 5 from the waste container 123. After rotating to a certain angle, all the cat litter will enter the separation area 124.

However, due to its larger size, the screen 126 keeps the excrement 5 outside the separation area 124. At the same time, the trap door 125 of the waste box 123 gradually opens due to its own weight.

Figure 11:
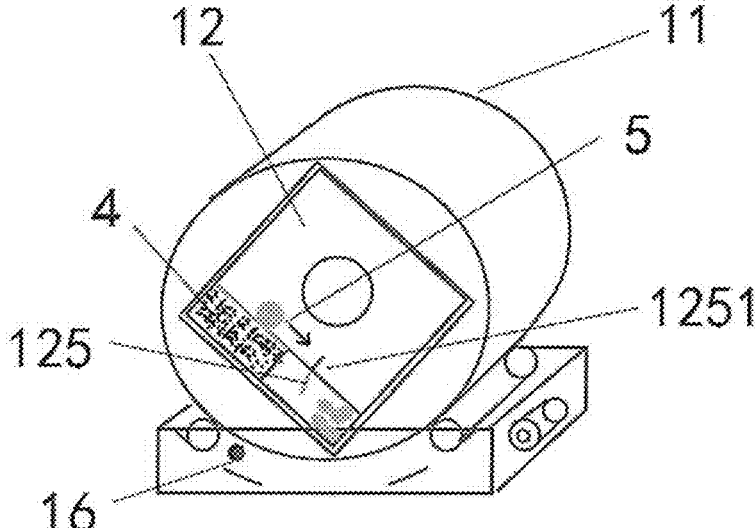
FIG. 11 shows a different position of the cat litter cabin in rotation.

When the cat litter cabin 1 rotates to the position where the stopper grooves 127 on the cabin body 11 reaches the travel switch 16, the driving motor 31 stops. At this time, the excrement 5 in the main box zone moves toward the waste container 123 due to gravity, and the trap door 125 of the waste container 123 is opened to allow the excrement 5 to fall into the waste container 123, directly or after hitting the baffle 1251, as shown in FIG. 11.

Figure 12:
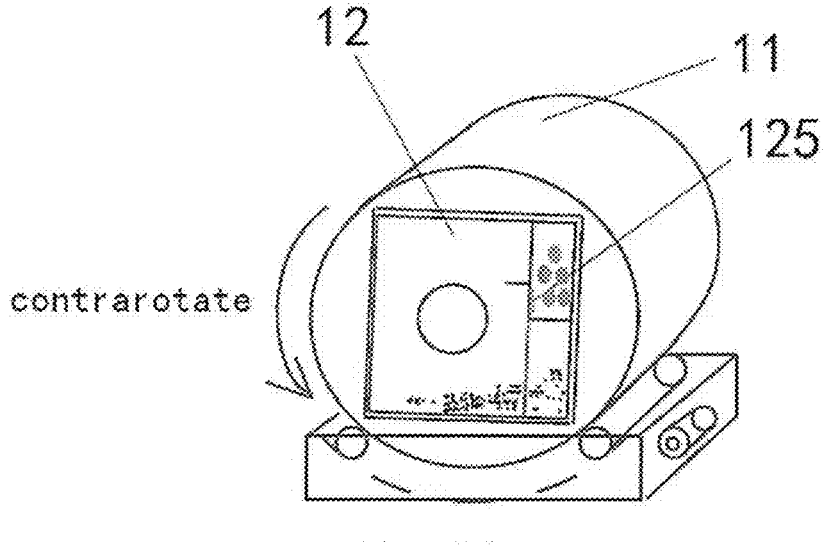
FIG. 12 shows another position of the cat litter cabin being rotated in opposite direction.

Five to ten seconds after the travel switch 16 is triggered, the excrement 5 has fallen into the waste container 123. The central processing unit causes the drive motor 31 to reverse the rotation of the cat litter cabin 1, as shown in FIG. 12. The cat litter 4 in the separation area 124 starts to move back to the bottom of the replacement box 12. The trap door 125 of the waste container 123 is gradually closed to prevent the excrement 5 from falling out.

Figure 13:
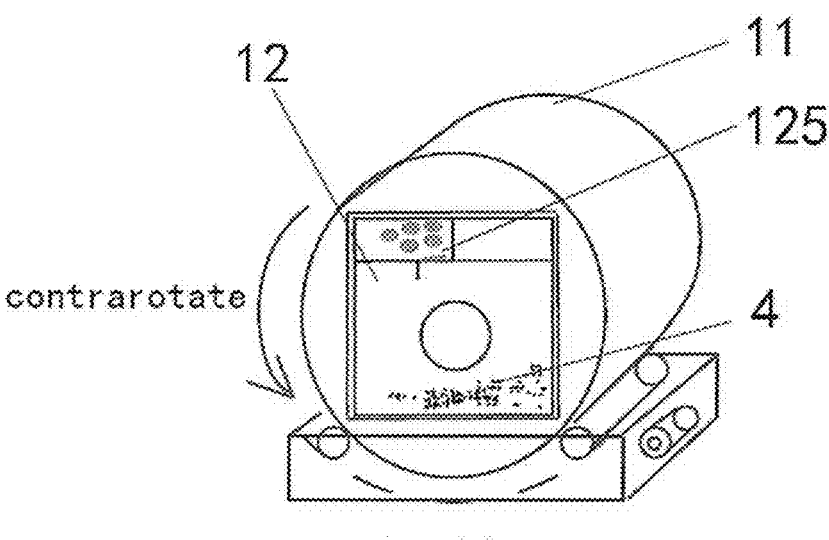
FIG. 13 shows another position of the cat litter cabin in counter-rotation.

The cat litter cabin 1 rotates counterclockwise until the cat litter cabin 1 returns to its original position, and the trap door 125 of the waste container 123 is closed. The cat litter 4 now returns to the bottom of the replacement box 12, but the cat litter 4 has yet fully levelled due to the friction existing in the cat litter 4, as shown in FIG. 13.

Figure 14:
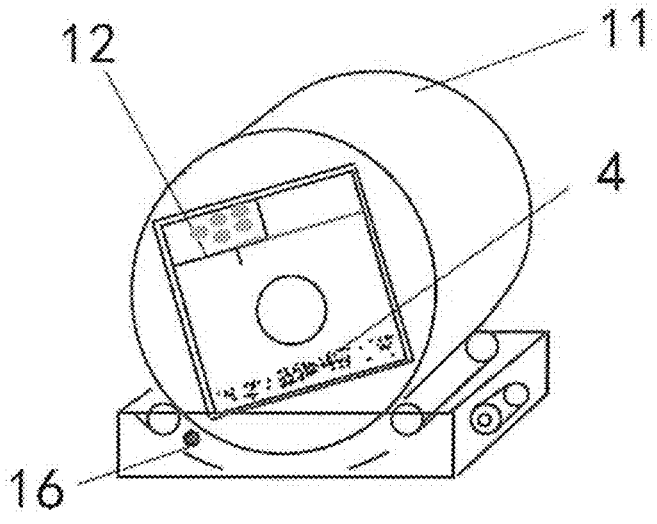
FIG. 14 shows another position of the cat litter cabin in counter-rotation

The cat litter cabin 1 continues to rotate in the counterclockwise direction. When the stopper groove 127 at the other end of the cabin body 11 reaches the travel switch 16, the driving motor 31 stops as shown in FIG. 14. At this point, the cat litter in the replacement has been levelled to cover the bottom of the box.

After that, the cat litter cabin 1 rotates clockwise again for four to five seconds, and the cat litter cabin 1 returns to the initial position to complete an automatic cleaning process. When the cat litter 4 reaches the end of its service life or the waste container 123 is full, the replacement box can be taken out the cat litter box and replaced with a new one.

Although the embodiments of the present invention have been shown and described above, it can be understood that the above embodiments are exemplary and should not be construed as limiting the present invention. Those of ordinary skill in the art can make changes, modifications, substitutions and modifications to the above-mentioned embodiments within the scope of the present invention without departing from the principle and purpose of the present invention. The scope of the present invention is defined by the appended claims.

What is claimed is:

1. A cat litter cleaning device, comprising a housing, a cat litter cabin and a driving device, wherein the cat litter cabin and the driving device are arranged in the housing, and the driving device is arranged to rotate the cat litter cabin, the cat litter cabin comprises a cabin body having a cavity with a cavity front, a supporting box slidably located in the cavity through the cavity front, and a replacement box removably located in the supporting box, wherein the replacement box has a front box side with an entrance through the front box side into the replacement box.

2. The cat litter cleaning device as set forth in claim 1, wherein the replacement box comprises a waste container, a separation area and a main box zone, wherein the waste container is separated from the main box zone by a trap door\, and the separation area is separated from the main box zone by a screen, and the entrance is arranged on one side of the main box zone, wherein the replacement box further comprises a bottom side perpendicular to the front box side and parallel to the screen.

3. The cat litter cleaning device as set forth in claim 2, wherein the replacement box is a cuboid, and the entrance is on the side of the main box zone perpendicular to the screen.

4. The cat litter cleaning device as set forth in claim 2, wherein the replacement box has a front panel on the front box side, a back panel, two side panels, a top panel and a bottom panel on the bottom side, and the replacement box has folding creases, including three intersecting creases on each of the side panels but only on the main box zone, and a single crease made across the entrance, parallel to the bottom panel.

5. The cat litter cleaning device as set forth in claim 1, wherein the driving device comprises a driving motor, a worm and worm gears, and wherein the cabin body has a rack coupled to the worm gears and the driving motor is arranged to drive the worm gears through the worm.

6. The cat litter cleaning device as set forth in claim 1, wherein the replacement box is magnetically coupled to the cabin cavity.

7. The cat litter cleaning device as set forth in claim 6, wherein the supporting box dimensioned to receive the replacement box, and the supporting box comprises sliding rails moveably engaged with sliding grooves in the cabin cavity, allowing the supporting box to move out of the cabin cavity for loading or unloading the replacement box, wherein the supporting box has a bottom support member, two parallel side support members, and a handle attached on an upper front end of the supporting box between the two parallel side support members and the replacement box is removably located in the supporting box between the two parallel side support members.

8. The cat litter cleaning device as set forth in claim 2, wherein the housing comprises a shell and a housing panel hinged with the shell, and an opening on the housing panel matching the entrance of the replacement box.

9. The cat litter cleaning device as set forth in claim 8, wherein the main box zone is arranged to receive cat litter, and the opening has a baffle arranged to cover the entrance to prevent the cat litter from spilling through the entrance when the cat litter cabin is rotated.

10. The cat litter cleaning device as set forth in claim 1, further comprising a sensor in the proximity of the entrance of the cat litter cabin for detection of a cat entering and leaving the cat litter cabin so as to trigger rotation of the cat litter cabin.

11. The cat litter cleaning device as set forth in claim 2, wherein the entrance into the replacement box is located between the screen and the bottom side.

\* \* \* \* \*